March 29, 1966  J. W. SHAFFER  3,242,701
PHOTOFLASH LAMP
Filed Dec. 2, 1963
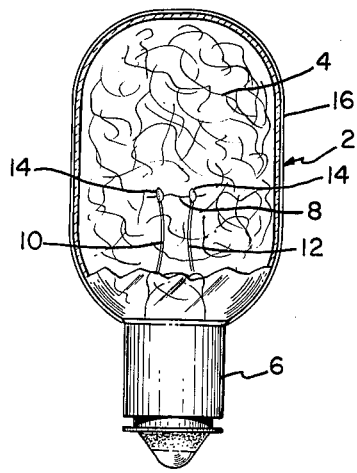
JOHN W. SHAFFER
INVENTOR.
BY Joseph C. Ryan
ATTORNEY United States Patent Office 3,242,701
Patented Mar. 29, 1966

3,242,701
PHOTOFLASH LAMP
John W. Shaffer, Williamsport, Pa., assignor to Sylvania Electric Products Inc., a corporation of Delaware
Filed Dec. 2, 1963, Ser. No. 327,363
5 Claims. (Cl. 67—31)

This invention relates to the manufacture of photoflash lamps and more particularly to the composition of the blue filter coating with which many of these lamps are provided.

Daylight type color films are designed so as to produce a final picture in which the colors of the image closely match those of the object being photographed when illuminated by daylight. In order to successfully use such films indoors or whenever insufficient natural daylight is available, it is necessary to provide artificial illumination having the same color quality as daylight. Photoflash lamps provided with a blue filter coating constitute a widely used source of artificial illumination for this purpose.

Although filter-coated flashlamps have been available commercially for a number of years, the filter coatings used have been characterized by one or more deficiencies. For example, some such coatings contain a blue pigment such as Prussian Blue. The solid particles of pigment in such filters strongly absorb radiant heat during operation of the flashlamp and thereby cause serious weakening of the lacquer film. Other filter coatings change in color either upon aging or exposure to light because of the instability of certain dyes ued as basic constituents. Still other filter coatings either fail to produce the necessary match to daylight or contain rare and expensive dyes which substantially increase the cost of manufacturing such flashlamps.

In more recent years, the availability of faster color film which can be used with relatively inexpensive cameras has caused a substantial increase in the popularity of color photography. Concurrently, there have been significant improvements in films which provide greater accuracy of color reproduction. To obtain optimum results with these films, and to utilize their potential color fidelity, it is mandatory that a light source be used that is an accurate match to daylight, for which the films are intended. Although indoor-type film is available, there is a definite trend toward the use of daylight-type film, probably because of the inconvenience of using filters for outdoor photography with indoor-type film.

In view of the foregoing circumstances, the desirability and the need for an improved filter coating for flashlamps has intensified.

Thus one of the principal objects of this invention is to develop a filter for flashlamps which provides a significantly better match to daylight than filter coatings presently used on commercial flashlamps.

Another object is to provide a filter which does not cause extensive thermal degradation of the safety coating during flash.

A further object is to provide a filter composition consisting entirely of widely-available and moderately-priced dyes which are stable with respect to fading due to aging, normal light exposure and humidity.

These and other objects, advantages and features are attained, in accordance with the principles of this invention, by providing an accurate filter coating based upon three dyes and certain ratios thereof which, by changing only the total dye concentration or the filter thickness, may be readily employed satisfactorily with all commercial flashlamps of both the zirconium and the aluminum-filled types. The filter comprising this invention is most conveniently applied as the protective coating on the exterior surface of the lamp envelope. However, it may be applied to the interior surface of the lamp envelope if so desired.

A filter prepared in accordance with the principles of this invention contains two different blue dyes and a red dye. The first blue dye is one exhibiting high absorptivity in the spectral band from about 660 to about 680 nanometers. This type of dye is marketed under several trade names, some of which are Grasol Fast Brilliant Blue 2GLN, Acetosol Blue GLS, and Nyastral Blue SS. The second blue dye is one which absorbs strongly in the spectral region from about 560 to about 650 nanometers. This type of dye is marketed under several trade names, some of which are Calcosyn Sapphire Blue 2GS, Amaplast Blue BGP, Oil Blue N, Garsol Blue 2GS, and Naceland Blue FFRN. The red dye absorbs strongly in the spectral region from about 480 to about 575 nanometers. This type of dye is marketed under several trade names, some of which are Artisil Direct Red 3BP, Celanthrene Red 3BN, and Calcosyn Pink B Double.

A suitable formula for a lacquer is as follows:

A 25% cellulose acetate solution is prepared by dissolving:

|  | Grams |
|---|---|
| Cellulose acetate (grade E-398 Eastman) | 250 |
| Acetone | 574 |
| Denatured ethanol | 142 |
| Diacetone alcohol | 34 |

A first blue dye solution is prepared by dissolving and filtering:

|  | Grams |
|---|---|
| Grasol Fast Brilliant Blue 2GLN | 1 |
| Methyl Cellosolve | 96 |

The concentration of this solution is then adjusted so that the transmittance at about 668 nanometers is about 37% for a 1:2,000 dilution by volume with acetone in a 1 cm. cell, relative to a similar cell with acetone.

A second blue dye solution is prepared by dissolving and filtering:

|  | Grams |
|---|---|
| Calcosyn Sapphire Blue 2GS | 1 |
| Methyl Cellosolve | 96 |

The concentration of this solution is then adjusted so that the transmittance at about 640 nanometers is about 61% for a 1:1,000 dilution by volume with acetone in a 1 cm. cell relative to a similar cell filled with acetone.

A red dye solution is prepared by dissolving and filtering:

|  | Grams |
|---|---|
| Artisil Direct Red 3BP | 1 |
| Methyl Cellosolve | 96 |

The concentration of this solution is then adjusted so that the transmittance at about 530 nanometers is about 25% for a 1:100 dilution by volume with acetone in a 1 cm. cell relative to a similar cell filled with acetone.

The foregoing ingredients are then mixed in the following proportions:

|  | Grams |
|---|---|
| 25% cellulose acetate solution | 400.0 |
| 1% first blue dye solution | 2.7 |
| 1% second blue dye solution | 6.9 |
| 1% red dye solution | 16.5 |

This lacquer is then applied to the lamp envelope of a flashlamp to form a coating, preferably about 4 mils thick when dry.

This specific filter coating formulation described above is designed for use primarily with an M-2 type flashlamp, of the type illustrated in the accompanying drawing. The illustrated lamp comprises an hermetically sealed, light-transmitting glass bulb 2 provided with a filling of a combustion-supporting gas such as oxygen at a pressure of about 95 cms., and a quantity of shredded aluminum foil 4. The bulb 2 is provided with a base 6 affixed to the neck thereof. A filament 8, the ends of which are attached to leadin wires 10 and 12, is disposed within the bulb 2. The inner ends of the leadin wires 10 and 12 are provided with a body of ignition paste or primer 14. The leadin wires 10 and 12 are connected to conventional base contacts in the usual manner. The outer wall of the bulb 2 is provided with a coating 16 of the type described above.

The filter coating composition of my invention is readily adaptable for use with flashlamps other than the M-2, such as an M-3 and an AG-1 for example.

The M-3 flashlamp is similar in overall size to the M-2, but it is provided with a filling of shredded zirconium foil instead of shredded aluminum foil and the combustion-supporting gas fill pressure is about 120 cms. The ingredients for the coating for the M-3 lamp are prepared as above and then mixed in the following proportions:

| | Grams |
|---|---|
| 25% cellulose acetate solution | 400.00 |
| 1% first blue dye solution | 2.15 |
| 1% second blue dye solution | 5.51 |
| 1% red dye solution | 13.17 |

This lacquer is then applied to the lamp envelope of an M-3 type flashlamp to form a coating, preferably about 4 mils thick when dry.

The AG-1 lamp is much smaller in size than the M-2 and the M-3. The combustible employed is shredded zirconium foil and the fill pressure of the combustion-supporting gas is several atmospheres. The ingredients for the coating for the AG-1 lamp are prepared as above and then mixed in the following proportions:

| | Grams |
|---|---|
| 25% cellulose acetate solution | 400.0 |
| 1% first blue dye solution | 0.98 |
| 1% second blue dye solution | 2.50 |
| 1% red dye solution | 5.99 |

This lacquer is then applied to the lamp envelope of an AG-1 type flashlamp to form a coating, preferably about 7 mils thick when dry.

For best results, some variations in coating formulations for each specific lamp type are preferred because of differences in their respective spectral energy distributions. These differences in color quality of the unfiltered lamps are attributable to the type of metal burned in the lamp and to the pressure of the combustion-supporting gas with which the lamp is provided. It will be noted from the foregoing description of the specific lamp types that the M-2 uses aluminum as the combustible whereas the M-3 and the AG-1 have zirconium as the combustible. The difference in color quality of the two zirconium lamps, the AG-1 and the M-3, is due primarily to the difference in gas fill pressures, the former being much higher than the latter as noted more specifically above.

In the foregoing examples and in the appended claims, reference is made to 1% dye solutions. As described above, these dye solutions are prepared by mixing 1 gram of the dye with 96 grams of the solvent, in this case as a specific example, methyl Cellosolve. These dye solutions have been designated as 1% on a weight-to-volume basis because the density of the dye solution is such that about 97 grams at room temperature occupy a volume of 100 milliliters; it therefore requires about 96 grams of methyl Cellosolve.

In the foregoing examples, certain dyes are identified by their trade names. For example, mention is made of Grasol Fast Brilliant Blue 2GLN, Calcosyn Sapphire Blue 2GS and Artisil Direct Red 3BP. Grasol Fast Brilliant Blue 2GLN is a sulfonated phthalocyamine dye of the type described in U.S. Patent 3,057,873 and exhibits a primary absorption peak at 668 millimicrons and a secondary absorption peak at 623 millimicrons. The chemical compositions of Calcosyn Sapphire Blue 2GS and Artisil Direct Red 3BP are set forth in detail in "Color Index" published by The American Association of Textile Chemists and Colorists, Lowell Technical Institute, Lowell, Massachusetts, the former being identified therein under Color Index No. 61505 Disperse Blue 3 and the latter under Color Index No. 60710 Disperse Red 15.

What I claim is:

1. A photoflash lamp comprising: an hermetically sealed, light-transmitting envelope; a source of actinic light contained within said envelope; and a color-correcting filter coating on said envelope, said coating being formed from a lacquer solution including a first blue dye exhibiting high absorptivity in the spectral band from about 660 to 680 nanometers, a second blue dye exhibiting high absorptivity in the spectral band from about 560 to 650 nanometers, and a red dye exhibiting high absorptivity in the spectral band from about 480 to 575 nanometers.

2. A photoflash lamp comprising: an hermetically sealed, light-transmitting envelope; a source of actinic light contained within said envelope; and a color-correcting filter coating on said envelope comprising a lacquer formed from a cellulose acetate solution and including a first blue dye exhibiting high absorptivity in the spectral band from about 660 to 680 nanometers, a second blue dye exhibiting high absorptivity in the spectral band from about 560 to 650 nanometers, and a red dye exhibiting high absorptivity in the spectral band from about 480 to 575 nanometers.

3. The combination of claim 2 in which said lacquer comprises about 400 grams of a 25% cellulose acetate solution, about 3 grams of a 1% solution of said first blue dye, about 7 grams of a 1% solution of said second blue dye, and about 16.5 grams of a 1% solution of said red dye.

4. The combination of claim 2 in which said lacquer comprises about 400 grams of a 25% cellulose acetate solution, about 2 grams of a 1% solution of said first blue dye, about 5.5 grams of a 1% solution of said second blue dye, and about 13 grams of a 1% solution of said red dye.

5. The combination of claim 2 in which said lacquer comprises about 400 grams of a 25% cellulose acetate solution, about 1 gram of a 1% solution of said first blue dye, about 2.5 grams of a 1% solution of said second blue dye, and about 6 grams of a 1% solution of said red dye.

References Cited by the Examiner

UNITED STATES PATENTS

| | | | |
|---|---|---|---|
| 2,269,984 | 1/1942 | Munder | 67—31 |
| 2,305,609 | 12/1942 | Eaton | 67—31 |
| 2,465,068 | 3/1949 | Dana | 67—31 |
| 2,527,010 | 10/1950 | Jenner | 67—31 X |
| 2,599,644 | 6/1952 | Keukens et al. | 67—31 |
| 3,067,601 | 12/1962 | Anderson et al. | 67—31 |

FREDERICK L. MATTESON, JR., *Primary Examiner.*

M. L. BATES, *Assistant Examiner.*